(12) United States Patent
Li et al.

(10) Patent No.: US 10,303,011 B2
(45) Date of Patent: May 28, 2019

(54) LCD PANEL WITH SMALL PIXELS AND SUB-PIXELS HAVING LADDER PATTERN

(71) Applicant: Himax Display, Inc., Tainan (TW)

(72) Inventors: Yuet Wing Li, Tainan (TW); Wen-Hsu Chen, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 15/716,542

(22) Filed: Sep. 27, 2017

(65) Prior Publication Data

US 2018/0307105 A1 Oct. 25, 2018

Related U.S. Application Data

(60) Provisional application No. 62/487,494, filed on Apr. 20, 2017.

(51) Int. Cl.
*G02F 1/1335* (2006.01)
*G02F 1/1343* (2006.01)

(52) U.S. Cl.
CPC .. *G02F 1/134309* (2013.01); *G02F 1/133514* (2013.01); *G02F 2001/134345* (2013.01); *G02F 2201/52* (2013.01)

(58) Field of Classification Search
CPC ......... G02F 1/134309; G02F 1/133514; G02F 2001/134345
See application file for complete search history.

(56) References Cited

U.S. PATENT DOCUMENTS

| | | | |
|---|---|---|---|
| 2004/0146791 A1* | 7/2004 | Sakurada | G02B 5/201 430/7 |
| 2012/0139911 A1* | 6/2012 | Saishu | G02B 27/0025 345/419 |
| 2012/0252152 A1* | 10/2012 | Hong | G02F 1/13624 438/34 |
| 2016/0077392 A1* | 3/2016 | Leu | G02F 1/1343 349/144 |
| 2017/0315279 A1* | 11/2017 | Matsui | G02B 5/201 |

FOREIGN PATENT DOCUMENTS

TW 594111 6/2004
WO 2016/033803 A1 3/2016

* cited by examiner

*Primary Examiner* — Nathanael R Briggs
(74) *Attorney, Agent, or Firm* — Winston Hsu

(57) ABSTRACT

The present invention provides a liquid crystal display (LCD) panel. The LCD panel comprises: an electrode layer. The electrode layer comprises: a plurality of pixels, each pixel comprising a plurality of types of sub-pixels, each type of sub-pixel having a ladder pattern with a plurality of sectors, wherein each sector comprises a plurality of units and each sector is shifted a unit width with each other.

10 Claims, 6 Drawing Sheets

LCD PANEL WITH SMALL PIXELS AND SUB-PIXELS HAVING LADDER PATTERN

CROSS REFERENCE TO RELATED APPLICATIONS

This application claims the benefit of U.S. Provisional Application No. 62/487,494, filed on Apr. 20, 2017 and included herein by reference.

BACKGROUND OF THE INVENTION

1. Field of the Invention

The present invention relates to a liquid crystal display (LCD) panel, and more particularly, to an LCD panel with small pixels and sub-pixels having a ladder pattern.

2. Description of the Prior Art

In general, the stripe pixels arrangement or delta pixel arrangement in a conventional liquid crystal display (LCD) panel will induce a strong fringing field and high spatial density grating. The high spatial density grating will induce high diffraction loss in 0 order. The strong fringing field (i.e. unwanted electric field) will drive the liquid crystal molecule align in an improper way. It induces high diffraction loss in 0 order and make the color to white ratio (CWR) become very low (e.q. lower than 20%).

SUMMARY OF THE INVENTION

It is therefore one of the objectives of the present invention to provide a liquid crystal display (LCD) panel with small pixels and sub-pixels having a ladder pattern, so as to solve the above problem.

In accordance with an embodiment of the present invention, an LCD panel with small pixels is disclosed. The LCD panel comprises: an electrode layer. The electrode layer comprises: a plurality of pixels, each pixel comprising a plurality of types of sub-pixels, each type of sub-pixel having a ladder pattern with a plurality of sectors, wherein each sector comprises a plurality of units and each sector is shifted a unit width with each other.

In accordance with an embodiment of the present invention, an LCD panel with small pixels is disclosed. The LCD panel comprises: an electrode layer, and a color filter. The electrode layer comprises: a plurality of pixels, each pixel comprising a plurality of types of sub-pixels, each type of sub-pixel having a ladder pattern with a plurality of sectors, wherein each sector comprises a plurality of units and each sector is shifted a unit width with each other. The color filter comprises: a plurality of ladder patterned color layers, disposed on the types of sub-pixels, respectively.

Briefly summarized, the LCD panel disclosed by the present invention can solve the problems of high diffraction loss and low CWR in the prior art.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and the claims to refer to particular system components. As one skilled in the art will appreciate, manufacturers may refer to a component by different names. This document does not intend to distinguish between components that differ in name but not function. In the following discussion and in the claims, the terms "include", "including", "comprise", and "comprising" are used in an open-ended fashion, and thus should be interpreted to mean "including, but not limited to . . . ". The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
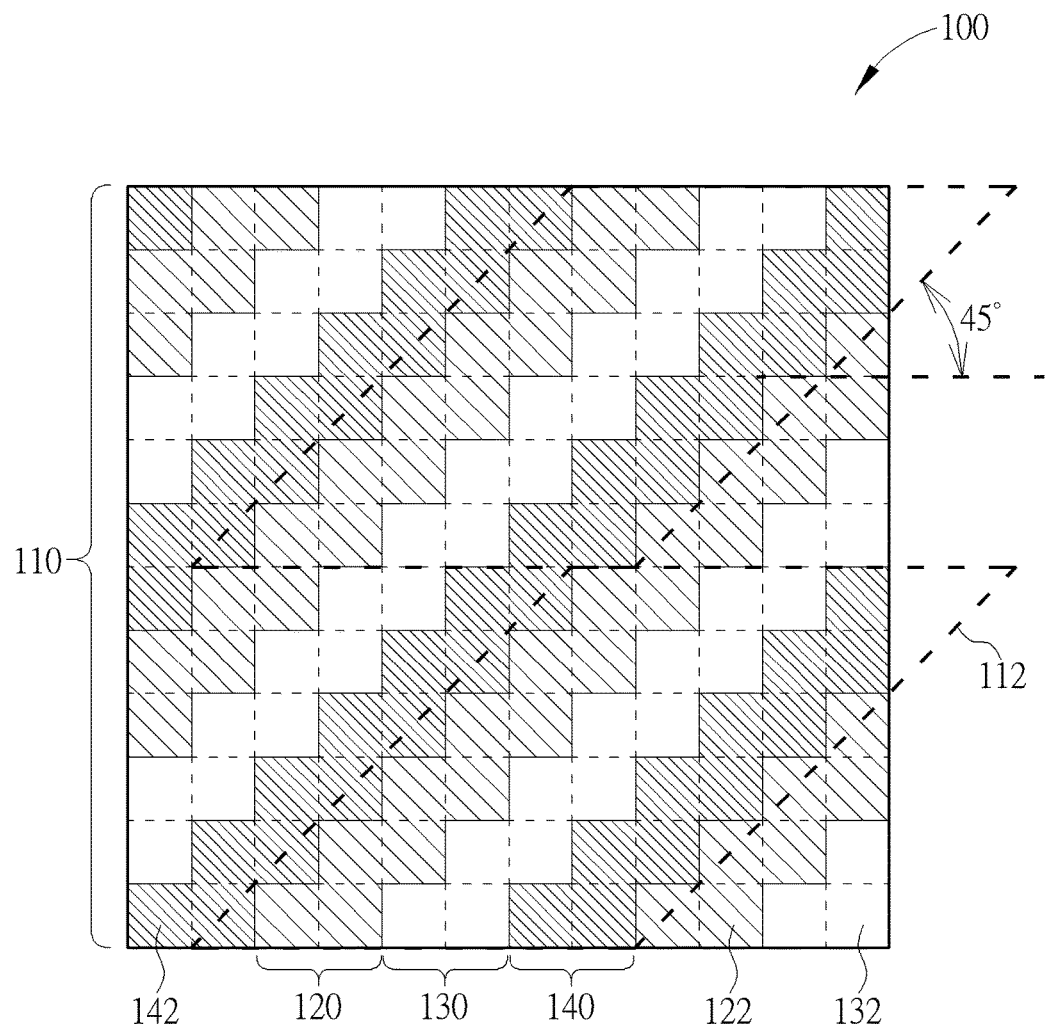
FIG. 1 shows a simplified top-view diagram of a liquid crystal display (LCD) panel with small pixels in accordance with a first embodiment of the present invention

Please refer to FIG. 1. FIG. 1 shows a simplified top-view diagram of a liquid crystal display (LCD) panel 100 with small pixels in accordance with a first embodiment of the present invention, wherein the LCD panel 100 can be a small size vertical alignment (VA) LCD panel. The LCD panel 100 comprises: an electrode layer 110. The electrode layer 110 comprises: a plurality of pixels 112, wherein each pixel 112 is smaller than 50 um. Each pixel 112 comprises a first type of sub-pixel 120, a second type of sub-pixel 130, and a third type of sub-pixel 140, wherein the first type of sub-pixel 120 can be a red sub-pixel, the second type of sub-pixel 130 can be a green sub-pixel, and the third type of sub-pixel 140 can be a blue sub-pixel. Each type of sub-pixel (120, 130, 140) has a ladder pattern with six sectors, and the liquid crystal alignment direction can be 45 degrees towards a horizontal line. For example, the first type of sub-pixel 120 has six sectors 122, and the second type of sub-pixel 130 has six sectors 132, and the third type of sub-pixel 140 has six sectors 142, wherein each sector (122, 132, 142) comprises two units and each sector is shifted a unit width with each other. In this way, the present invention can preserve the s or p polarization state and produce a suitable electric field to avoid forming any high spatial density diffraction pattern so as to greatly reduce diffraction loss. Please note that the above embodiment is only for an illustrative purpose and is not meant to be a limitation of the present invention. For example, the electrode layer 110 can further comprise other types of the sub-pixels such as yellow sub-pixels, magenta sub-pixels, or cyan sub-pixels. The number of sectors (122, 132, 142) and the units of the sectors can be changed according to different design requirements.

Figure 2:
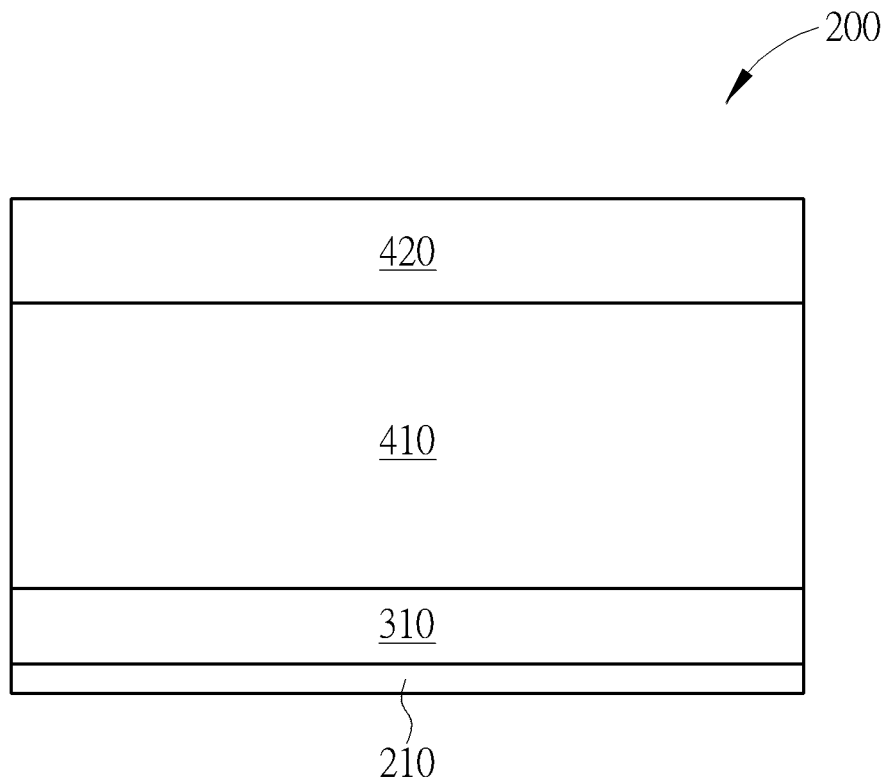
FIG. 2 shows a simplified cross-sectional diagram of a LCD panel with small pixels in accordance with a second embodiment of the present invention
Figure 3:
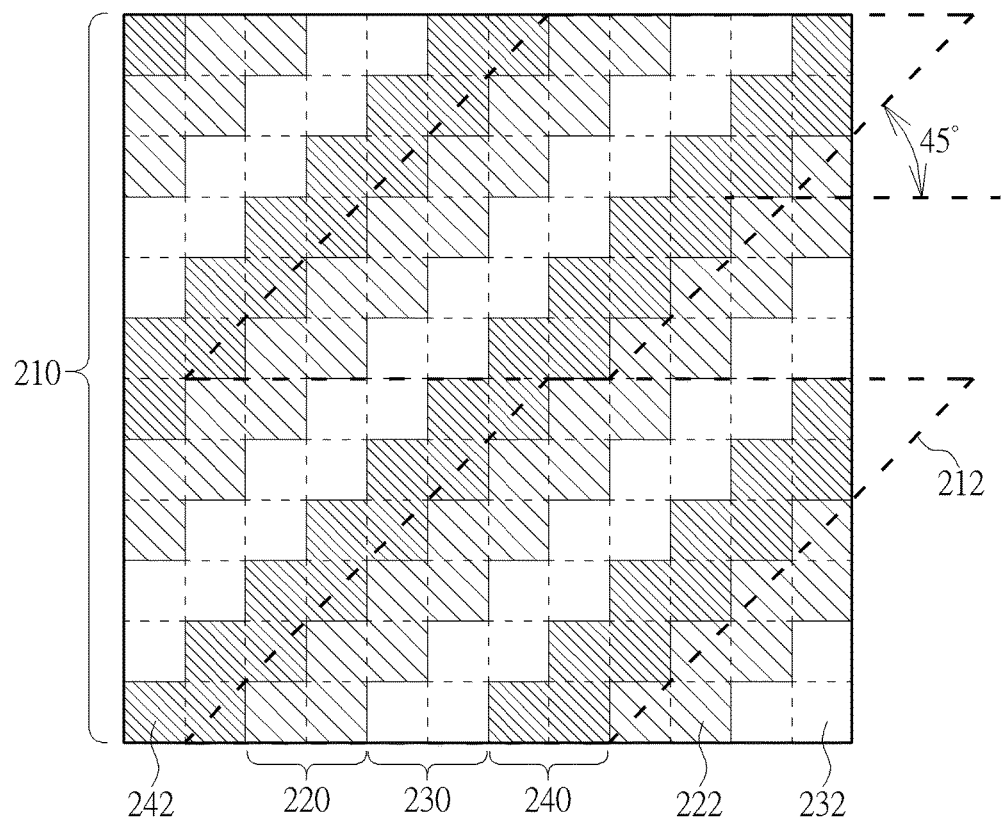
FIG. 3 shows a simplified top-view diagram of the electrode layer in the LCD panel in FIG. 2.

Please refer to FIG. 2. FIG. 2 shows a simplified cross-sectional diagram of a LCD panel 200 with small pixels in accordance with a second embodiment of the present invention, wherein the LCD panel 200 can be a small size VA LCD panel with pixels smaller than 50 um. The LCD panel 200 comprises: an electrode layer 210, a color filter 310, a liquid crystal (LC) layer 410, and an alignment layer 420. The LCD panel 200 can have a thickness under 7 um. Please refer to FIG. 3. FIG. 3 shows a simplified top-view diagram of the electrode layer 210. The electrode layer 210 comprises: a plurality of pixels 212, wherein each pixel 212 is smaller than 50 um. Each pixel 212 comprises a first type of sub-pixel 220, a second type of sub-pixel 230, and a third type of sub-pixel 240, wherein the first type of sub-pixel 220 can be a red sub-pixel, the second type of sub-pixel 230 can be a green sub-pixel, and the third type of sub-pixel 240 can be a blue sub-pixel. Each type of sub-pixel (220, 230, 240) has a ladder pattern with six sectors, and the liquid crystal alignment direction can be 45 degrees towards a horizontal line. For example, the first type of sub-pixel 220 has six sectors 222, and the second type of sub-pixel 230 has six sectors 232, and the third type of sub-pixel 240 has six sectors 242, wherein each sector (222, 232, 242) comprises two units and each sector is shifted a unit width with each other. In this way, the present invention can preserve the s or p polarization state and produce a suitable electric field to avoid forming any high spatial density diffraction pattern so as to greatly reduce diffraction loss. Please note that the above embodiment is only for an illustrative purpose and is not meant to be a limitation of the present invention. For example, the electrode layer 210 can further comprise other types of the sub-pixels such as yellow sub-pixels, magenta sub-pixels, or cyan sub-pixels. The number of sectors (222, 232, 242) and the units of the sectors can be changed according to different design requirements.

Figure 4:
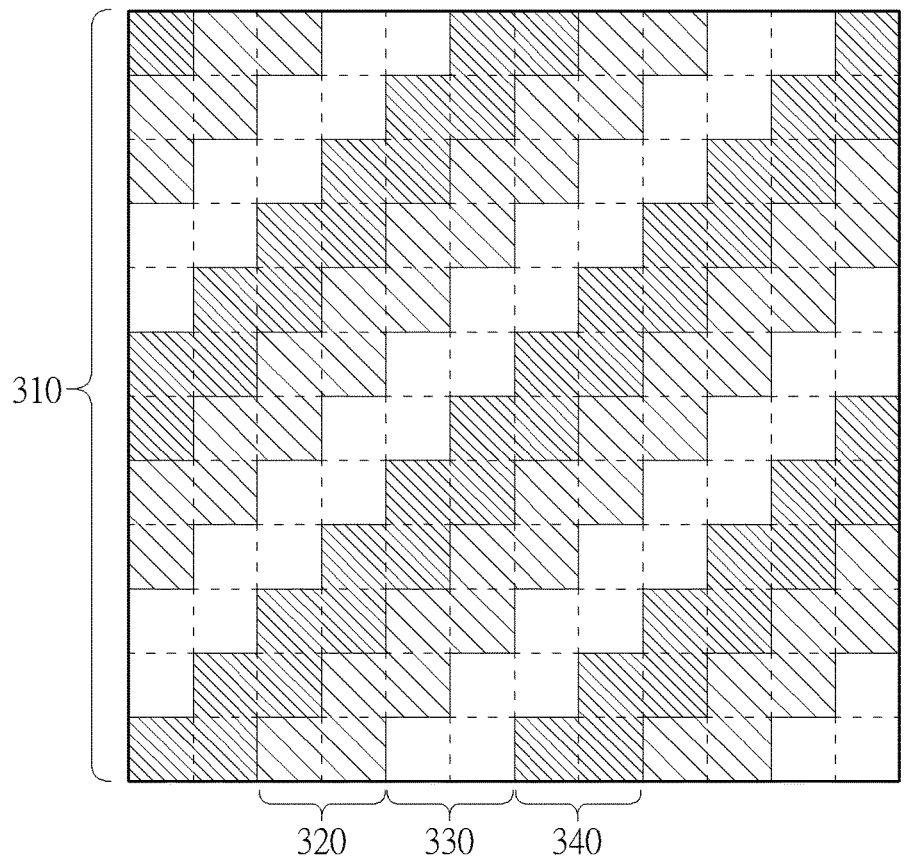
FIG. 4 shows a simplified top-view diagram of the color filter in the LCD panel in FIG. 2.

Please refer to FIG. 4. FIG. 4 shows a simplified top-view diagram of the color filter 310. The color filter 310 comprises: a first type of ladder patterned color layer 320, a second type of ladder patterned color layer 330, and a third type of ladder patterned color layer 340, wherein the first type of ladder patterned color layer 320, the second type of ladder patterned color layer 330, and the third type of ladder patterned color layer 340 are disposed on the first type of sub-pixel 220, the second type of sub-pixel 230, and the third type of sub-pixel 240, respectively. The first type of ladder patterned color layer 320 can be a red ladder patterned color layer. The second type of ladder patterned color layer 330 can be a green ladder patterned color layer. The third type of ladder patterned color layer 340 can be a blue ladder patterned color layer. Please note that the above embodiment is only for an illustrative purpose and is not meant to be a limitation of the present invention. For example, the color filter 310 can further comprise other types of the ladder patterned color layers such as yellow ladder patterned color layers, magenta ladder patterned color layers, or cyan ladder patterned color layers.

Figure 5:
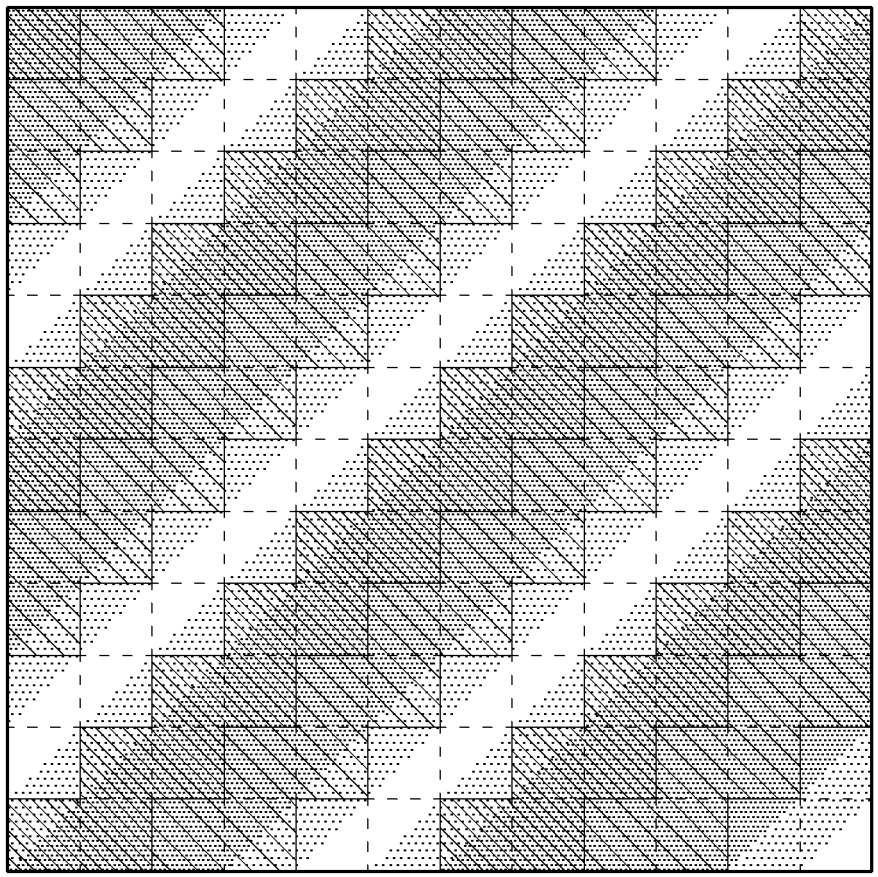
FIG. 5 shows a simplified simulation diagram of the LCD panel according to one sub-pixel scenario of the present invention.

Please refer to FIG. 5. FIG. 5 shows a simplified simulation diagram of the LCD panel (100, 200) according to one sub-pixel scenario of the present invention. As shown in FIG. 5, the pixel electrode shows good fit with the LC light on position, and no color filter shift is required, and no small pitch grating pattern is found. The color to white ratio (CWR) can be highly modulated by the dark pixel voltage, and the CWR can change from 20% to over 100%. For example, the CWR can be over 50% with minimum interpixel contrast over 50:1.

Figure 6:
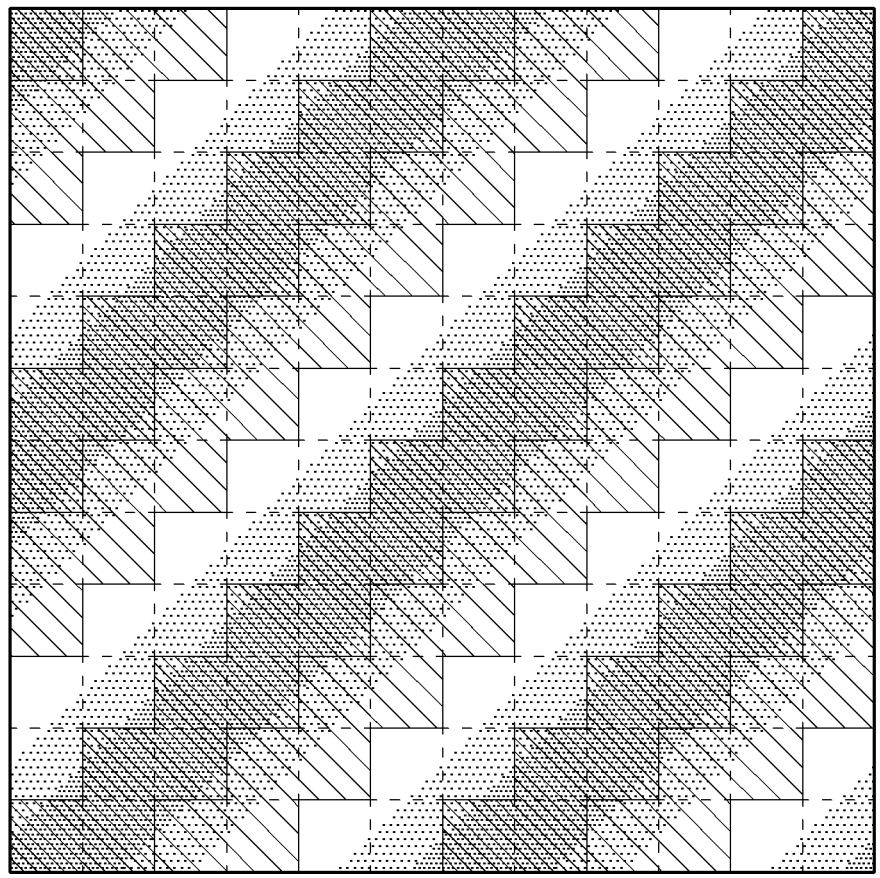
FIG. 6 shows a simplified simulation diagram of the LCD panel according to two sub-pixel scenario of the present invention.

Please refer to FIG. 6. FIG. 6 shows a simplified simulation diagram of the LCD panel (100, 200) according to two sub-pixel scenario of the present invention. As shown in FIG. 6, the pixel electrode shows good fit with the LC light on position, and no color filter shift is required. The color to white ratio (CWR) can be highly modulated by the dark pixel voltage, and the CWR can be over 50% with minimum interpixel contrast over 50:1. The dark pixel bias in FIG. 6 is not the same with that in FIG. 5, so it requires some logic on the LCD panel (100, 200) to control the dark voltage bias.

Briefly summarized, the LCD panel disclosed by the present invention can solve the problems of high diffraction loss and low CWR in the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal display (LCD) panel with small pixels, comprising:
   an electrode layer, comprising:
   a plurality of pixels, each pixel comprising a plurality of types of sub-pixels, each type of sub-pixel having single color and having a ladder pattern with a plurality of sectors, wherein each sector comprises a plurality of units and each sector is shifted a unit width with each other.

2. The LCD panel of claim 1, wherein the types of sub-pixels comprises red sub-pixels, green sub-pixels, and blue sub-pixels.

3. The LCD panel of claim 2, wherein the types of sub-pixels further comprises yellow sub-pixels, magenta sub-pixels, or cyan sub-pixels.

4. The LCD panel of claim 2, wherein the each pixel is smaller than 50 um.

5. An LCD panel with small pixels, comprising:
   an electrode layer, comprising:
   a plurality of pixels, each pixel comprising a plurality of types of sub-pixels, each type of sub-pixel having single color and having a ladder pattern with a plurality of sectors, wherein each sector comprises a plurality of units and each sector is shifted a unit width with each other; and
   a color filter, comprising:
   a plurality of ladder patterned color layers, disposed on the types of sub-pixels, respectively.

6. The LCD panel of claim 5, wherein the types of sub-pixels comprises red sub-pixels, green sub-pixels, and blue sub-pixels.

7. The LCD panel of claim 6, wherein the ladder patterned color layers comprises red ladder patterned color layers, green ladder patterned color layers, and blue ladder patterned color layers.

8. The LCD panel of claim 6, wherein the types of sub-pixels further comprises yellow sub-pixels, magenta sub-pixels, or cyan sub-pixels.

9. The LCD panel of claim 8, wherein the ladder patterned color layers further comprises yellow ladder patterned color layers, magenta ladder patterned color layers, or cyan ladder patterned color layers.

10. The LCD panel of claim 5, wherein the each pixel is smaller than 50 um.

* * * * *